United States Patent [19]

Opitz et al.

[11] 4,115,531
[45] Sep. 19, 1978

[54] PRODUCTION OF HYDROCHLORIC ACID BY REMOVING HYDROGEN CHLORIDE FROM COMBUSTION GAS

[75] Inventors: Wolfgang Opitz, Hürth-Alstädten; Hans Hennen, Hürth, both of Fed. Rep. of Germany

[73] Assignee: Hoechst Aktiengesellschaft, Frankfurt am Main, Fed. Rep. of Germany

[21] Appl. No.: 820,043

[22] Filed: Jul. 29, 1977

[30] Foreign Application Priority Data

Aug. 4, 1976 [DE] Fed. Rep. of Germany ........ 2634959

[51] Int. Cl.² ............................................. C01B 7/08
[52] U.S. Cl. ..................................... 423/488; 423/240; 423/241; 423/481
[58] Field of Search .............. 423/481, 488, 240, 241

[56] References Cited

U.S. PATENT DOCUMENTS

| | | | |
|---|---|---|---|
| 2,950,170 | 8/1960 | Harnisch et al. | 423/488 |
| 3,140,155 | 7/1964 | Cull et al. | 423/481 X |
| 3,387,430 | 6/1968 | Savardi, Jr. | 423/481 X |
| 3,666,424 | 5/1972 | Cox | 423/488 |
| 3,826,816 | 7/1974 | McCormick | 423/481 X |
| 3,980,758 | 9/1976 | Krumbock et al. | 423/488 X |
| 4,018,879 | 4/1977 | Winnen | 423/481 |

FOREIGN PATENT DOCUMENTS

| | | | |
|---|---|---|---|
| 950,079 | 2/1964 | United Kingdom | 423/488 |
| 1,070,515 | 6/1967 | United Kingdom | 423/488 |

*Primary Examiner*—Earl C. Thomas
*Attorney, Agent, or Firm*—Connolly and Hutz

[57] ABSTRACT

Hydrochloric acid having a substantially constant HCl content of 20 to 36% is produced continuously by removing hydrogen chloride from hot combustion gas. To this end, hot combustion gas containing 1 to 10% by volume of HCl and steam, this gas being obtained by the joint combustion of off-gases containing chlorinated hydrocarbons and liquid residues of chlorinated hydrocarbons, is introduced into a quenching zone, and quenched therein, down to a temperature lower than its dew point, by means of cooled hydrochloric acid containing hydrogen chloride in a concentration of 20 to 36%, which concentration corresponds to the concentration of the hydrochloric acid which is to be produced. The resulting gas-liquid mixture is separated in an absorption cooling zone into cooled hydrochloric acid and cooled combustion gas containing 0.1 to 1% by volume of HCl. The cooled hydrochloric acid is introduced into a reservoir zone capable of receiving a multiple of the quantity of hydrochloric acid produced per hour, and recycled from the said reservoir zone to the quenching zone. Additional 20 to 36% hydrochloric acid produced is taken out of the quenching cycle.

8 Claims, 1 Drawing Figure

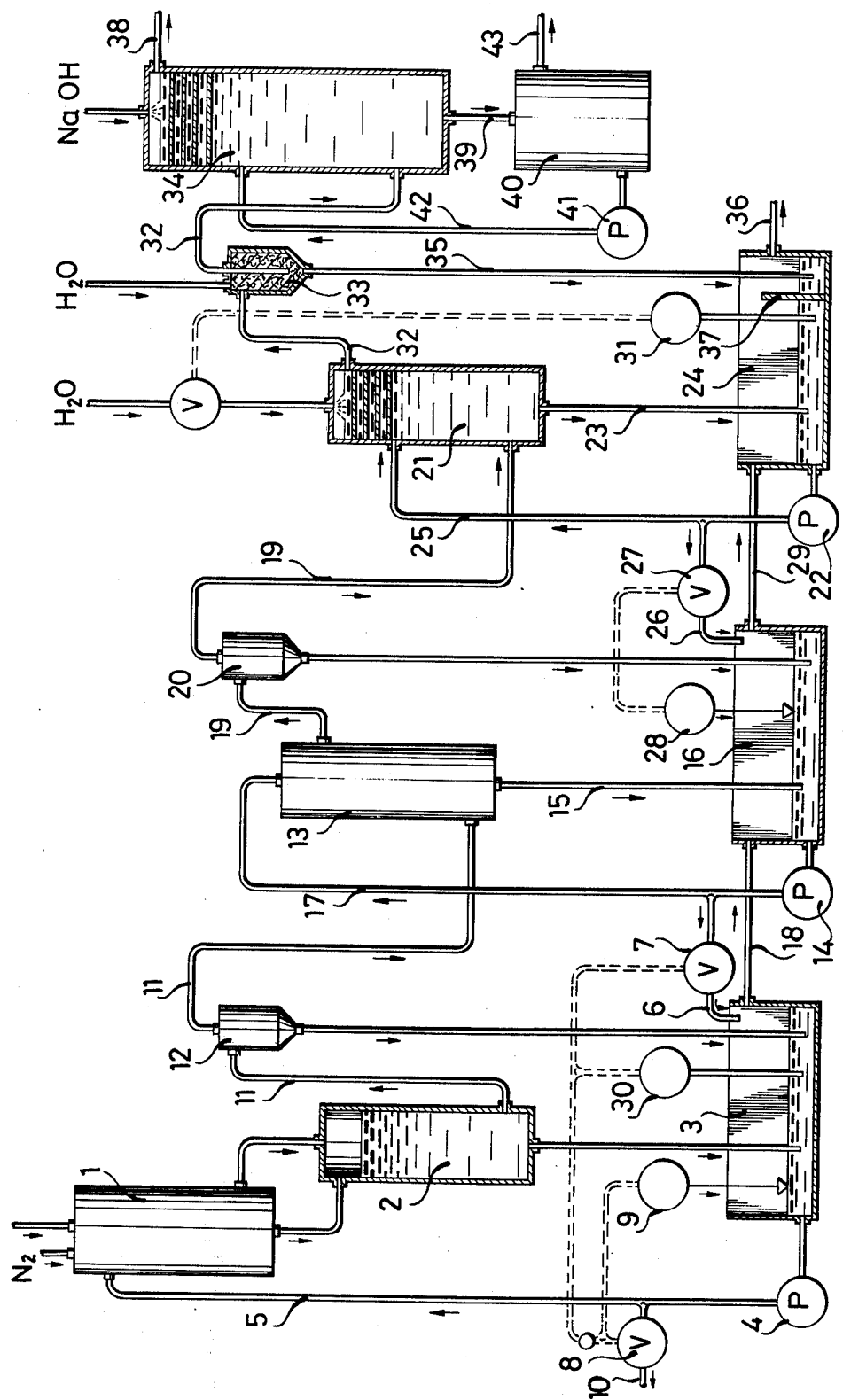

PRODUCTION OF HYDROCHLORIC ACID BY REMOVING HYDROGEN CHLORIDE FROM COMBUSTION GAS

This invention relates to a process for the continuous production of hydrochloric acid having a substantially constant HCl content of 20 to 36% by removing hydrogen chloride from hot combustion gas by quenching it with previously produced hydrochloric acid. The percentages given in the present description and claims are by weight unless otherwise stated.

German Patent Specification No. 1,228,232 describes a process wherein liquid chlorinated hydrocarbons of various chlorine contents are incinerated so as to yield hydrochloric acid and an off-gas which is free from chlorine and free from carbon black. The combustion gases coming from the incinerator have a temperature of about 600° C. In an off-gas conduit, they are quenched with water, or hydrochloric acid having a strength of about 20%, down to about 100° C., whereby the hydrogen chloride present in the combustion gases is partially condensed or absorbed. Cooling down to 20° C. produces hydrochloric acid of about 35% strength. Next, the combustion gases, which still contain hydrogen chloride, are delivered to an absorption tower, and scrubbed with water or hydrochloric acid therein; a further quantity of 35% hydrochloric acid is thus obtained. In a scrubbing tower disposed downstream of the absorption tower, the combustion gases are water-scrubbed once again, and hydrochloric acid having a strength of about 20% is obtained, part of which is used for quenching the hot combustion gases, or as scrubbing liquid in the absorption tower.

The process described in German Patent Specification No. 1,228,232 is, however, not suitable for use in the continuous production of hydrochloric acid of constant HCl concentration from combustion gases such as those which are obtained by the joint combustion of off-gases containing chlorinated hydrocarbons and liquid residues of chlorinated hydrocarbons. The reasons for this are that very variable quantities of off-gas containing chlorinated hydrocarbons have to be dealt with, and that the combustion gases contain very variable proportions of hydrogen chloride; in addition, the scrubbed off-gas still has a relatively high HCl content, e.g. of 0.25% by volume, which is not altogether satisfactory.

It is therefore a particular object of this invention to obviate the deficiencies described above by providing a process in which hot combustion gases are processed initially in a quenching cycle and thereafter in a first scrubbing cycle and a second scrubbing cycle, the latter being both provided downstream of the quenching cycle, and each of the three cycles having a large hydrochloric acid reservoir (i.e. large with respect to the quantity of hydrochloric acid produced per hour) in which hydrochloric acid is temporarily stored at concentrations which decrease from cycle to cycle in the downstream order. We achieve the particular object just mentioned by arranging that, if the combustion gases are found to temporarily contain an excessively high proportion of HCl, which would give hydrochloric acid more concentrated than would be desirable, the acid is admixed, from the downstream reservoir(s), with hydrochloric acid of lower concentration, over a period as long as necessary to reestablish the desired HCl content in the hydrochloric acid of higher concentration, which is then removed as the desired product; if, on the other hand, the combustion gases are found to temporarily have too low a content of HCl, which would give hydrochloric acid less concentrated than would be desirable, the latter is collected in the reservoir of the quenching cycle, or even allowed to overflow to the reservoirs for hydrochloric acid of decreasing concentration, which as indicated above are disposed downstream of the quenching cycle reservoir, the acid being retained until the HCl content of the combustion gas commences increasing again so that hydrochloric acid of the desired concentration can be removed as the product. A still more specific object of the present invention is to provide a process which finally produces scrubbed off-gas containing less than 20 ppm of HCl and $Cl_2$.

According to the present invention, we provide broadly a process for the continuous production of hydrochloric acid having a substantially constant HCl content of 20 to 36% by removing hydrogen chloride from hot combustion gas by quenching it with previously produced hydrochloric acid, which process comprises: introducing hot combustion gas containing 1 to 10% by volume of HCl and steam, this gas being obtained by the joint combustion of off-gases containing chlorinated hydrocarbons and liquid residues of chlorinated hydrocarbons, into a quenching zone, and quenching it therein, down to a temperature lower than its dew point, by means of cooled hydrochloric acid containing hydrogen chloride in a concentration of 20 to 36% which concentration corresponds to the concentration of the hydrochloric acid which is to be produced; separating the resulting gas-liquid mixture in an absorption cooling zone into cooled hydrochloric acid and cooled combustion gas containing 0.1 to 1% by volume of HCl; introducing the said cooled hydrochloric acid into a reservoir zone capable of receiving a multiple (as herein defined) of the quantity of hydrochloric acid produced per hour; and recycling the hydrochloric acid from the said reservoir zone to the quenching zone, the additional 20 to 36% hydrochloric acid produced being taken out of the quenching cycle comprising the said quenching, absorption cooling and reservoir zones, as the desired product.

By a "multiple", we mean, in the present description and claims, at least twice the quantity of hydrochloric acid produced per hour; as indicated below, however, this factor, which need not be an integer, is preferably much greater than 2, e.g. 10 to 40.

Preferred features of the present invention comprise:

(a) delivering the cooled combustion gas containing 0.1 to 1% by volume of HCl from the absorption cooling zone to a first scrubbing cycle, and scrubbing it therein with hydrochloric acid having a strength of 3 to 19, preferably 5 to 15%, the latter being circulated through a reservoir zone which forms part of the first scrubbing cycle and which has a capacity which is a multiple (as herein defined) of the quantity of hydrochloric acid produced per hour;

(b) upon the hydrochloric acid concentration in the quenching cycle being found to temporarily exceed a predetermined nominal value, this being adjustable by adjustment of a density recorder which monitors the density of the acid in the reservoir zone of the quenching cycle, pumping hydrochloric acid of lower concentration from the reservoir zone of the first scrubbing cycle to the reservoir zone of the quenching cycle, and taking the 20 to 36% hydrochloric acid constituting the desired product out of the quenching cycle only after the nominal concentration value has been reestablished therein;

(c) upon the hydrochloric acid concentration in the quenching cycle being found to temporarily fall below a predetermined nominal value, this value being adjustable by adjustment of a density recorder which monitors the density of the acid in the reservoir zone of the quenching cycle, collecting hydrochloric acid of lower concentration in the reservoir zone of the quenching cycle, and, if necessary, allowing it to overflow into the reservoir zone of the first scrubbing cycle, and taking the 20 to 36% hydrochloric acid constituting the desired product out of the quenching cycle only after the nominal concentration value has been re-established therein;

(d) delivering the scrubbed combustion gas which still contains up to 0.1% by volume of HCl from the first scrubbing cycle to a second scrubbing cycle, scrubbing the combustion gas therein with hydrochloric acid having a strength of 0.5 to 2%, the latter being circulated through a reservoir zone which forms part of the second scrubbing cycle and which has a capacity which is a multiple (as herein defined) of the quantity of hydrochloric acid produced per hour, and admixing the hydrochloric acid in the second scrubbing cycle with the quantity of water necessary to maintain a maximum HCl concentration of 0.5 to 2%, the quantity of water to be admixed with this acid being determined by means of a density recorder which monitors the density of the acid in the reservoir zone of the second scrubbing cycle;

(e) collecting, in the reservoir zone of the first scrubbing cycle, hydrochloric acid having a strength of 3 to 19%, and adjusting the contents of this reservoir zone, as necessary, by allowing the acid therein to overflow into the reservoir zone of the second scrubbing cycle, or by pumping hydrochloric acid having a strength of 0.5 to 2% from the reservoir zone of the second scrubbing cycle to the reservoir zone of the first scrubbing cycle;

(f) passing the scrubbed combustion gas coming from the second scrubbing cycle, this gas containing $N_2$, $CO_2$, $O_2$ and steam, through a layer of iron or copper fragments which are sprinkled with water, and thereafter contacting the gas with a sodium hydroxide solution having a strength of about 1%, and discharging the resulting gas containing less than 20 ppm of HCl and $Cl_2$ into the atmosphere; and (g) providing the quenching cycle, the first scrubbing cycle and the second scrubbing cycle with respective reservoir zones which each have a capacity which is 10 to 40 times the volume of hydrochloric acid produced per hour.

A preferred specific process in accordance with the present invention will now be described with reference to the accompanying drawing, the single FIGURE of which is a diagrammatic side view of an apparatus suitable for use in accordance with the invention.

Hot combustion gas at about 1000° C., containing hydrogen chloride, is introduced into a cooling device providing a quenching zone, shown at 1, in which it is quenched down to 60° C., i.e. down to a temperature well below its dew point, by means of a quenching liquid (hydrochloric acid) which is circulated by means of a pump 4 through an absorption cooler 2 and a reservoir 3, the quenching liquid being admitted to the quenching zone 1 through at least three pipes 5 (only one of which is shown in the drawing) providing inlets which are disposed in a single plane. The combustion gas is further cooled in the cooler 2, whereby most of the hydrogen chloride is absorbed with the resultant formation of additional hydrochloric acid. The circulated quantity of hydrochloric acid, which has the concentration desired for the final product, and the cooling surface of the cooler 2 are so related that the liquid leaves the cooler 2 with a temperature of 15° to 20° C., e.g. 17° C. The acid is re-introduced into the quenching zone 1 by way of the pipes 5. In this manner, it is possible to obtain hydrochloric acid of 30% strength, for example, according to the partial pressure prevailing. The reservoir 3 serves for temporary storage of hydrochloric acid of 20 to 36% strength.

The HCl concentration range desired in the reservoir 3, e.g. 29–30% HCl, is established by means of a density recorder 30 operating in association with the quenching cycle. The recorder 30 controls a valve 7, the arrangement being such as to prevent this desired concentration range from being exceeded by providing for the admission, as necessary, of hydrochloric acid having a strength of 3–19%, preferably 5–15%, this acid coming from a first scrubbing cycle, as desired below, via a conduit 6. While maintaining the desired concentration range, the recorder 30 regulates the opening of a valve 8, the latter being additionally controlled, however, by an automatic level indicator 9. As a result, continually formed fresh hydrochloric acid in concentrated form (e.g. 29–30% HCl) can be taken from the quenching cycle for any desired use, through a conduit 10, as long as the hydrochloric acid in the reservoir 3 does not fall below a certain minimum level, this being controlled by means of the level indicator 9.

Those constituents of the combustion gas which are not condensed in the cooler 2, which usually consist predominantly of nitrogen and carbon dioxide with minor proportions of hydrogen, oxygen and hydrogen chloride, are conveyed at approximately 30° C. through a conduit 11 and a droplet separator 12 to a washing or scrubbing tower 13 forming part of the first scrubbing cycle. In the tower 13, the gas is further cooled down to about 20° C. by scrubbing it with cooled hydrochloric acid having a strength of 3–19%, preferably 5–15%, whereby its hydrogen chloride content is further reduced. The scrubbing liquid is circulated by means of a pump 14 through a conduit 15, a second reservoir 16, in which the above-mentioned 3–19% (preferably 5–15%) hydrochloric acid is temporarily stored, a conduit 17 and the tower 13. The conduit 17 branches off to the above-mentioned conduit 6 and valve 7 whereby dilute hydrochloric acid from the first scrubbing cycle can be admitted to the reservoir 3 as necessary. An overflow line 18 provides a connection from an upper level of the reservoir 3 to the reservoir 16, this overflow line being used in the event of excessively large quantities of hydrochloric acid of lower concentration than desirable being admitted to the reservoir 3. The overflow of hydrochloric acid of insufficiently high concentration or density, e.g. having a strength of less than 30 weight % of HCl, is temporarily stored in the reservoir 16 of the first scrubbing cycle.

The gas scrubbed in the tower 13 is conveyed through a conduit 19 and a second droplet separator 20 to a scrubbing tower 21 which forms part of a second scrubbing cycle, and of which the upper third is provided with bubble trays. In the tower 21, the gas is scrubbed with cooled hydrochloric acid having a strength of 0.5 to 2%, and its hydrogen chloride content is thus further reduced. In this second scrubbing cycle, the scrubbing liquid is circulated by means of a pump 22 through a conduit 23, a third reservoir 24, in which the 0.5 to 2% acid is temporarily stored, a conduit 25 and the tower 21. To ensure constant coverage with water of the bubble trays in the tower 21, and to ensure a maximum hydrogen chloride content of 2% for the scrubbing liquid used in the second scrubbing cycle, fresh water is continually admitted to the head of the tower 21. The admission of fresh water to the bubble trays of the tower 21 is controlled by means of a second density recorder 31. The conduit 25 branches off to a pipe 26 and a valve 27 whereby the acid in the second reservoir 16 can be further diluted; a level indicator 28 causes the valve 27 to be opened when the level of acid in the reservoir 16 falls below a predetermined minimum level. A second overflow line 29 provides a connection from an upper level of the reservoir 16 to the reservoir 24, this overflow line being used in the event of unduly large quantities of dilute acid being collected in the reservoir 16. The overflow of this dilute acid is conveyed for further temporary storage to the reservoir 24 of the second scrubbing cycle. Excess quantities of 0.5 to 2% hydrochloric acid leave the reservoir 24 by way of a conduit 36 provided beyond a partition 27, as shown.

The gas scrubbed in the tower 21 is introduced through a conduit 32 via a separating vessel 33 into a spray tower 34. In the separating vessel 33, which is filled with metal turnings or chips (e.g. iron or copper) which are water-sprayed from above, the very minor proportions of chlorine and hydrogen chloride still present in the gas are chemically bound, apart from the traces thereof to which reference is made below. Dissolved metal chlorides run down through a conduit 35 and leave through the conduit 36.

The spray tower 34 is supplied from above with dilute sodium hydroxide solution having a strength of approximately 1%, which enables the last traces of chlorine and hydrogen chloride to be removed from the gas. The purified off-gas ($N_2$, $CO_2$, $O_2$, $H_2O$) leaves the apparatus through a conduit 38. The sodium hydroxide solution is re-circulated by means of a pump 41 through a bottom outlet 39, a container 40, a conduit 42 and the spray tower 34, but is finally removed as spent liquor through a conduit 43 and may then be utilised for neutralizing the hydrochloric acid flowing out through the conduit 36.

The invention is illustrated by the following Example, which is concerned with a procedure employing an apparatus as described above with reference to the accompanying drawing.

EXAMPLE

The hot combustion gas used was derived from 200 normal $m^3$/h (S.T.P.) of off-gas containing chlorinated hydrocarbons and having a chlorine content of 0.17 kg/normal $m^3$ (composition in % by volume: ethylene = 7.8; ethane = 1.0; methane = 0.2; dichloroethane = 4.0; ethyl chloride = 2.0; HCl = 0.6; oxygen = 3.4; inert gas ($N_2$, $CO_2$) = 81.0). The off-gas was admitted to a combustion chamber and burnt therein together with 226 kg/h of liquid residues of chlorinated hydrocarbons (C = 45.5%; H = 6.5%; Cl = 48%). The liquid residues were atomised with 450 normal $m^3$/h of air and 90 kg/h of steam, and a further 1350 normal $m^3$/h of air was used for combustion.

The 200 normal $m^3$/h of off-gas and 226 kg/h of liquid residues contained 142 kg/h (predominantly combined) of chlorine and gave 146 kg/h of hydrogen chloride, after combustion.

From the combustion chamber there was taken 2250 normal $m^3$/h of combustion gas containing hydrogen chloride. This combustion gas was actually composed of:

|  | Normal $m^3$/h | % by volume |
|---|---|---|
| Inert gas ($N_2$, $CO_2$) | 1845 | 82 |
| HCl | 90 (=146 kg) | 4 |
| Steam | 293 | 13 |
| Oxygen | 22 | 1 |
| Total | 2250 | 100 |

The combustion gas left the chamber with a temperature of approximately 1000° C. It was introduced into the quenching zone 1. At the same time, 100 normal $m^3$/h of nitrogen was introduced as a corrosion inhibitor into a compensator of steel construction, associated with the quenching zone 1. In the quenching zone 1, the combustion gas was quenched down to 60° C. with the use of 20 normal $m^3$/h (23020 kg/h) of 30 weight % hydrochloric acid with a temperature of 17° C., and it left the quenching zone together with the hydrochloric acid, which was found to have been heated to 47° C. In the absorption cooler 2 downstream of the quenching zone 1, the gas was further cooled to 30° C. and the hydrochloric acid to 17° C. During this operation, a major proportion of the steam, namely 176 kg/h of $H_2O$, was condensed. In addition, 128 kg/h of the hydrogen chloride was absorbed in the hydrochloric acid, and altogether 23324 kg/h of hydrochloric acid of 30.16% strength left the cooler 2, and was conveyed to the reservoir 3 (capacity = 12 $m^3$). To produce hydrochloric acid with a strength of exactly 30%, 182 kg/h of 10% hydrochloric acid from the first scrubbing cycle was admitted through the conduit 6 to the reservoir 3. This gave altogether 23506 kg/h of 30% hydrochloric acid, of which 486 kg/h was removed for use through the conduit 1o, the remaining 23020 kg/h (20 normal $m^3$/h) being recycled and admitted at 17° C. to the quenching zone 1 through the pipes 5.

The uncondensed constituents of the combustion gas which left the cooler 2 through the conduit 11 comprised:

|  | Normal $m^3$/h | % by volume |
|---|---|---|
| Inert gas ($N_2$, $CO_2$) | 1945 | 94.8 |
| HCl | 11 (=18 kg) | 0.5 |
| Steam | 74 (=59 kg) | 3.6 |
| Oxygen | 22 | 1.1 |
| Total | 2052 | 100.0 |

Circulated by pumping in the first scrubbing cycle (comprising components 13 to 17) was 10 normal $m^3$/h of 10% hydrochoric acid which had a temperature of 16° C., whereby 25 kg/h of steam and 16.5 kg/h of HCl were separated by condensation from the combustion gas, which was cooled down to 20° C. The concentration of hydrochloric acid in the reservoir 16 (capacity = 12 $m^3$) was maintained at 10% by supplying, through the pipe 26, 140.5 kg/h of 1% hydrochloric acid from the second scrubbing cycle. Thus the first scrubbing cycle was fed with altogether 182 kg/h of 10% HCl and the same quantity was removed therefrom through the conduit 6 and conveyed to the quenching cycle.

The uncondensed constituents of the scrubbed combustion gas which left the scrubbing tower 13 through the conduit 19 comprised:

|  | Normal m³/h | kg/h |
|---|---|---|
| Inert gas (N₂, CO₂) | 1945 | |
| HCl | — | 1.5 |
| Steam | 42 | 34 |
| Oxygen | 22 | |

Circulated by pumping in the second scrubbing cycle (comprising components 21–25) was 10 normal m³/h of 1% hydrochloric acid, whereby a further 4 kg/h of steam and a further 1.4 kg/h of HCl were separated by condensation from the combustion gas, which was cooled down to 18° C. To maintain a 1% concentration of hydrochloric acid in the reservoir 24 (capacity = 12 m³), and more specifically to provide for a compensation of the 140.5 kg/h of 1% hydrochloric acid which was removed through the conduit 26, the head of the scrubbing tower 21 was supplied with 135 kg/h of fresh water. Thus equal quantities of material were fed to, and removed from, the second scrubbing cycle.

The uncondensed constituents of the combustion gas, after it had thus been scrubbed twice, left the tower 21 through the conduit 32. They comprised:

|  | Normal m³/h | kg/h |
|---|---|---|
| Inert gas (N₂, CO₂) | 1945 | |
| HCl | — | <0.1 |
| Steam | 37 | 30 |
| Oxygen | 22 | |

10 normal m³/h of 1% NaOH was circulated in the NaOH cycle comprising components 34 and 39–42. 100 l/h of 1% NaOH was introduced from above into the spray tower 34, which had bubble trays disposed in its upper portion, and an equal quantity of spent sodium hydroxide solution was taken from the container 40 through the conduit 43. The off-gas, comprising ca. 2004 normal m³/h, which was allowed to escape into the atmosphere through the conduit 38 consisted of 1945 normal m³/h of inert gas (N₂, CO₂), 22 normal m³/h of oxygen, 37 normal m³/h of steam, with less than 20 ppm of HCl and Cl₂.

What is claimed is:

1. A process for the continuous production of hydrochloric acid having a substantially constant HCl content of 20 to 36% by removing hydrogen chloride from hot combustion gas which comprises: introducing hot combustion gas containing 1 to 10% by volume of HCl and steam, this gas being obtained by the joint combustion of off-gases containing chlorinated hydrocarbons and liquid residues of chlorinated hydrocarbons, into a quenching zone, and quenching it therein, down to a temperature lower than its dew point, by means of cooled hydrochloric acid containing hydrogen chloride in a concentration of 20 to 36%, which concentration corresponds to the concentration of the hydrochloric acid which is to be produced; introducing the resulting gas-liquid mixture into an absorption cooling zone wherein upon cooling steam is condensed and gaseous hydrogen chloride absorbed in the liquid, the phases separating into cooled hydrochloric acid and cooled combustion gas containing 0.1 to 1% by volume of HCl; introducing the said cooled hydrochloric acid into a reservoir zone capable of receiving a multiple of the quantity of hydrochloric acid produced per hour; and recycling the hydrochloric acid from the said reservoir zone to the quenching zone, the additional 20 to 36% hydrochloric acid produced being taken out of the quenching cycle comprising the said quenching, absorption cooling and reservoir zones, as the desired product.

2. A process as claimed in claim 1, wherein the cooled combustion gas containing 0.1 to 1% by volume of HCl is delivered from the absorption cooling zone to a scrubbing cycle and scrubbed therein with hydrochloric acid having a strength of 3 to 19%, the latter being circulated through a reservoir zone which forms part of the scrubbing cycle and which has a capacity which is a multiple of the quantity of hydrochloric acid produced per hour.

3. A process as claimed in claim 2, wherein, in the event of the hydrochloric acid concentration in the quenching cycle being found to temporarily exceed a predetermined nominal value, this value being adjustable by adjustment of a density recorder which monitors the density of the acid in the reservoir zone of the quenching cycle, hydrochloric acid of lower concentration is pumped from the reservoir zone of the first scrubbing cycle to the reservoir zone of the quenching cycle, and the 20 to 36% hydrochloric acid constituting the desired product is taken out of the quenching cycle only after the nominal concentration value has been re-established therein.

4. A process as claimed in claim 2, wherein, in the event of the hydrochloric acid concentration in the quenching cycle being found to temporarily fall below a predetermined nominal value, this value being adjustable by adjustment of a density recorder which monitors the density of the acid in the reservoir zone of the quenching cycle, hydrochloric acid of lower concentration is collected in the reservoir zone of the quenching cycle, and, if necessary, is allowed to overflow into the reservoir zone of the first scrubbing cycle, and the 20 to 36% hydrochloric acid constituting the desired product is taken out of the quenching cycle only after the nominal concentration value has been re-established therein.

5. A process as claimed in claim 2, wherein scrubbed combustion gas which still contains up to 0.1% by volume of HCl is delivered from the first scrubbing cycle to a second scrubbing cycle, and is scrubbed therein with hydrochloric acid having a strength of 0.5 to 2%, the latter being circulated through a reservoir zone which forms part of the second scrubbing cycle and which has a capacity which is a multiple of the quantity of hydrochloric acid produced per hour, and the hydrochloric acid in the second scrubbing cycle is admixed with the quantity of water necessary to maintain a maximum HCl concentration of 0.5 to 2%, the quantity of water to be admixed with this acid being determined by means of a density recorder which monitors the density of the acid in the reservoir zone of the second scrubbing cycle.

6. A process as claimed in claim 5, wherein hydrochloric acid having a strength of 3 to 19% is collected in the reservoir zone of the first scrubbing cycle, and the contents of this reservoir zone are adjusted, as necessary, by following the acid therein to overflow into the reservoir zone of the second scrubbing cycle, or by pumping hydrochloric acid having a strength of 0.5 to 2% from the reservoir zone of the second scrubbing cycle to the reservoir zone of the first scrubbing cycle.

7. A process as claimed in claim 5, wherein the respective reservoir zones of the quenching cycle, first scrubbing cycle and second scrubbing cycle each have a capacity which is 10 to 40 times the volume of hydrochloric acid produced per hour.

8. A process as claimed in claim 5, wherein the scrubbed combustion gas coming from the second scrubbing cycle, this gas containing $N_2$, $CO_2$, $O_2$, steam and minor proportions of HCl and $Cl_2$, is passed through a layer of iron or copper fragments which are sprinkled with water, a part of the HCl and $Cl_2$ being chemically bound and the formed metal chlorides dissolved and separated, and thereafter the gas is contacted with a sodium hydroxide solution having a strength of about 1%, whereby a further part of the HCl and $Cl_2$ is chemically bound and the resulting gas containing less than 20 ppm of HCl and $Cl_2$ is discharged into the atmosphere.

* * * * *

UNITED STATES PATENT AND TRADEMARK OFFICE
CERTIFICATE OF CORRECTION

PATENT NO. : 4,115,531
DATED : September 19, 1978
INVENTOR(S) : Opitz et al

It is certified that error appears in the above-identified patent and that said Letters Patent are hereby corrected as shown below:

Column 4 line 22 change "desired" to --described--.

Column 8 line 62 change "following" to --allowing--.

Signed and Sealed this

Twentieth Day of February 1979

[SEAL]

Attest:

RUTH C. MASON
Attesting Officer

DONALD W. BANNER
Commissioner of Patents and Trademarks